United States Patent [19]
Yang et al.

[11] Patent Number: 4,462,018
[45] Date of Patent: Jul. 24, 1984

[54] SEMICONDUCTOR STRAIN GAUGE WITH INTEGRAL COMPENSATION RESISTORS

[75] Inventors: Maurice Yang, Costa Mesa; Carlyle A. Mounteer, Irvine, both of Calif.

[73] Assignee: Gulton Industries, Inc., Costa Mesa, Calif.

[21] Appl. No.: 439,282

[22] Filed: Nov. 5, 1982

[51] Int. Cl.$^3$ ............................ G01L 1/22; G01B 7/20
[52] U.S. Cl. .......................................... 338/3; 338/9; 338/42; 73/708; 73/721; 73/DIG. 4; 73/720; 73/766
[58] Field of Search ........................................ 338/2-5, 338/9, 42, 308; 73/720, 721, 708, 727, 766, 774, 776, DIG. 4

[56] References Cited

U.S. PATENT DOCUMENTS

| | | | |
|---|---|---|---|
| 3,341,794 | 9/1967 | Stedman | 73/720 X |
| 4,079,349 | 3/1978 | Dorfeld | 338/9 |
| 4,217,570 | 8/1980 | Holmes | 338/308 |
| 4,287,772 | 9/1981 | Mounteer et al. | 73/720 |
| 4,299,130 | 11/1981 | Konveal | 73/766 |
| 4,325,048 | 4/1982 | Zaghi et al. | 338/3 |

Primary Examiner—Roy N. Envall, Jr.
Assistant Examiner—Christopher N. Sears
Attorney, Agent, or Firm—J. J. Blatt

[57] ABSTRACT

A transducer operating on the strain gauge principle having integral temperature compensation and calibration resistors is disclosed. In the presently preferred embodiment, a silicon dioxide layer is disposed on a silicon substrate. Platinum alloy strain gauge resistors are disposed on the silicon dioxide layer and form a Wheatstone bridge circuit configuration. Laser trimable chromium nitride, platinum alloy and gold temperature compensation and calibration resistors are formed on the silicon dioxide layer from the same films used to form the strain gauge, adhesion layers, conductors and bonding pads, to permit the transducer to be calibrated such that its electrical characteristics are in conformance to specified tolerances when the transducer is subjected to temperature variations.

10 Claims, 4 Drawing Figures

SEMICONDUCTOR STRAIN GAUGE WITH INTEGRAL COMPENSATION RESISTORS

BACKGROUND OF THE INVENTION

1. Field of the Invention

The present invention relates to the field of transducers of the solid state strain gauge type.

2. Art Background

It is well known to fabricate pressure transducers by defining patterns or regions of materials having strain gauges on a flexible diaphragm. In general, commercial embodiments of these transducers are either diffused regions in a monocrystalline diaphragm or a thin film on a metal or other diaphragm.

The solid state semiconductor approach to these transducers (diffused regions in a monocrystalline substrate/diaphragm) has the advantage of using well developed semiconductor processing. This processing includes such steps as growing oxide layers, depositing layers by evaporation sputtering and plating, masking, as well as diffusion, chemical and plasma etching and ion milling. These steps allow the simultaneous fabrication of many identical transducers and compensating circuits, including active networks on the same substrate at a relatively low cost. For an example of such fabrication, see U.S. Pat. Nos. 3,764,950 and 4,033,787. However, these prior art devices have some drawbacks. The current density in the doped regions can be sufficiently high to cause continued diffusion of the dopant into the substrate which changes the resistivity of the gauge. In addition, the deflection of the substrate may cause the relocation of crystal dislocations which may influence carrier mobility, and thereby change the strain gauge resistance. Moreover, mobile ions which pass to the gauge junctions may cause conductivity changes which will also affect stability.

Aside from the above mentioned problems which historically are common in semiconductor strain gauge transducers, the devices possess non-linear thermal sensitivity characteristics when subjected to changes in temperature. In addition, semiconductor transducers will not operate well at temperatures above 125° C. It is commonly required that temperature compensating and calibration resistors be externally coupled to the strain gauge in order to balance the circuit and provide substantially the same electrical output for various temperature environments. The addition of these external resistors results in increased transducer cost. Furthermore, the difference in thermal mass between the resistors and the strain gauge structure and/or the existance of a thermal gradient across the transducer may require a warm-up period of up to several hours before expected precision can be achieved.

As will be described, the present invention provides a semiconductor strain gauge transducer with integral temperature compensating and calibration resistors on the same silicon substrate on which the transducer is formed. Thus, the system of present invention does not require the use of additional substrate or other material, and due to the resistors' location on the same silicon substrate as the transducer, possesses the same warm up characteristics as the strain gauge itself. In addition, the compensating and calibration resistors are formed from the same films which are used to form the strain gauge and adhesion layers as well as the contact pads.

SUMMARY OF THE INVENTION

A transducer operating on the strain gauge principle having integral temperature compensation and calibration resistors is disclosed. In the presently preferred embodiment, a silicon dioxide layer is disposed on a silicon substrate. Platinum alloy strain gauge resistors are disposed on the silicon dioxide layer and form a Wheatstone bridge circuit configuration. Laser trimable chromium nitride, platinum alloy, and gold temperature compensation and calibration resistors are formed on the silicon dioxide layer from the same films which form the strain gauge, to permit the transducer to be calibrated such that its electrical characteristics conform to desired specifications when the transducer is subjected to various temperature environments. The gold layer which forms the temperature compensation resistors also provides the necessary contact pads and conductive leads to interconnect the various resistors. Conventional masking and etching steps, well known in the art, are used to define the strain gauge resistors and contact lines and pads. It has been found that chromium nitride's negative thermal coefficient of resistivity (TCR) tends to compensate the platinum alloy resistors' positive TCR, thereby promoting temperature compensation for the transducer as a whole.

DETAILED DESCRIPTION OF THE INVENTION

A transducer operating on the strain gauge principle having integral temperature compensation calibration resistors is disclosed. In the following description, for purposes of explanation, numerous details are set forth, such as thicknesses, materials, and other dimensions, to provide a thorough understanding of the present invention. However, it will be apparent to one skilled in the art the inventive concepts disclosed in this application may be practiced without employing these specific details. In other instances, well known structures and processes, such as masking and etching steps, are not described in detail in order not obscure the present invention unnecessarily.

In the presently preferred embodiment, the present invention utilizes the teachings of U.S. Pat. No. 4,287,772 issued on Sept. 8, 1981, which is assigned to the Assignee of the subject Patent. The above referenced patent is hereby fully incorporated into this specification by reference.

Figure 1:
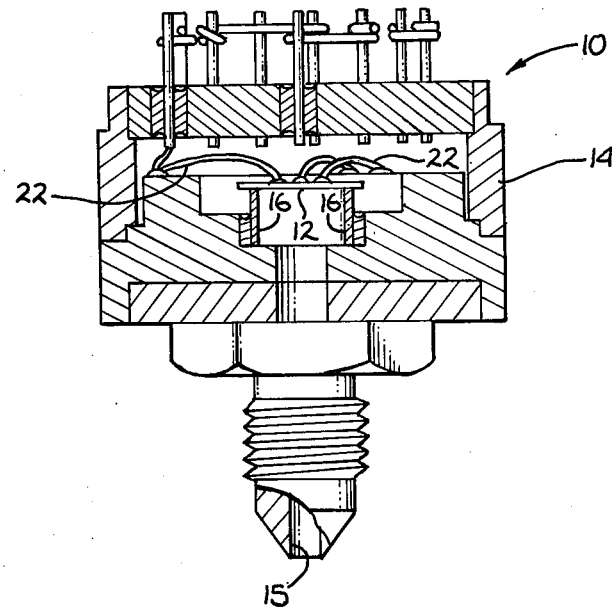
FIG. 1 is a cross sectional view of the strain gauge transducer of the present invention mounted in a package.

Referring now to FIG. 1, the assembly 10 of the present invention includes a strain gauge transducer 12, within a housing 14. As illustrated, the transducer 12 is mounted within the housing 14 such that its central area is free to deform in response to gas pressure applied through passage 15 into the housing 14. The transducer 12 is mounted on a support 16 and is bonded to the support by an electrostatic seal 18 or the like. Lead wires 22 are wire bonded to appropriate pads on the semiconductor transducer 12 to permit the electrical characteristics of the transducer to be sensed, and thus the induced strain on the device determined as is well known in the art.

Figure 3:
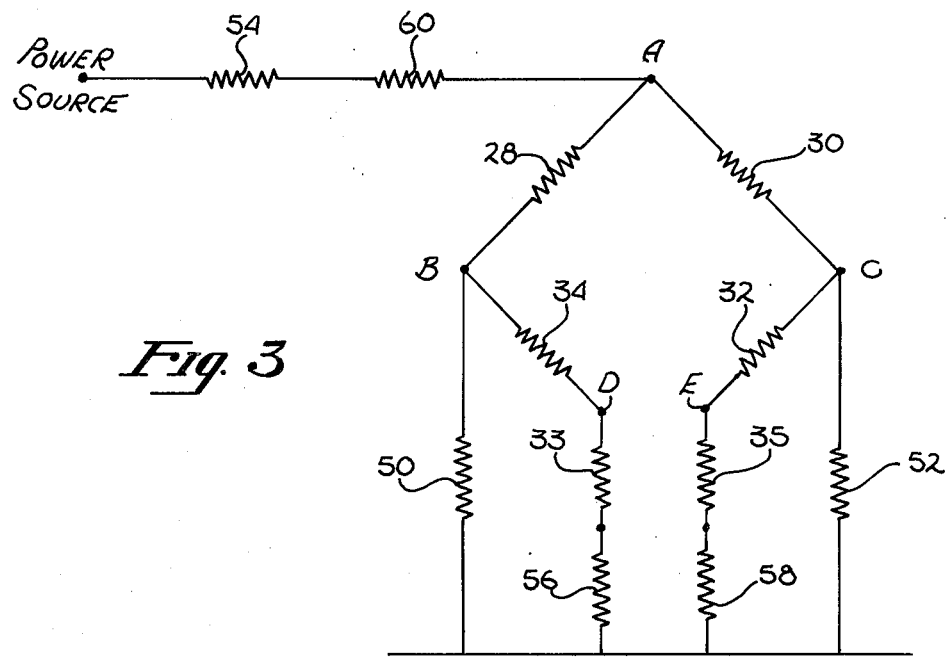
FIG. 3 is an electrical schematic of the invented transducer showing the general Wheatstone bridge resistor configuration, and the integral temperature compensation and calibration resistors which are formed integrally on the silicon substrate.
Figure 4:
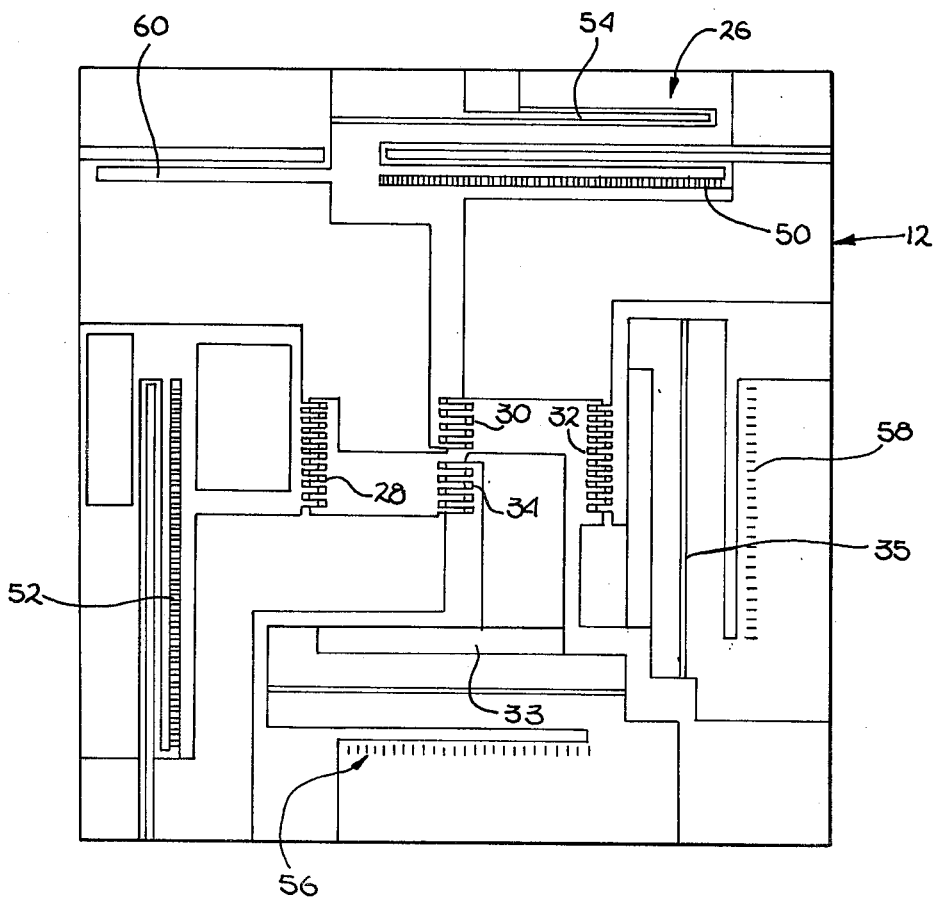
FIG. 4 is a plan view illustrating the top surface of the invented transducer.

With reference now to FIGS. 3 and 4, the upper surface 26 of the transducer 12 includes 4 active strain gauge resistors 28, 30, 32, and 34. These resistors are coupled in a generally Wheatstone bridge configuration. Each of the four resistors has equal nominal resistance, and in the presently preferred embodiment comprises a platinum alloy, specifically platinum which includes approximately 3% tungsten. Other metals, such as tantalum, nichrome, or rhenium, may also be used for the strain gauge material. The general serpentine pattern of each resistor (as best shown in FIG. 4) is formed from 0.5 mil wide lines of strain gauge alloy separated by 0.5 mil wide spaces. In addition, trimable platinum alloy resistors 33 and 35 are provided as shown for gross calibration purposes. Thus, nodes A,B,C,D, and E may be defined as shown in FIG. 3.

In the presently preferred embodiment, the lower surface of the transducer 12 is etched to define a thin diaphragm region having two unetched regions referred to as "mesas". The strain resistors 28, 30, 32 and 34 are formed over these thinner areas where the strains due to diaphragm distortion under applied pressure are confined, in order to improve transducer output sensitivity. The particular structure of the transducer substrate and the etching steps utilized in the presently preferred embodiment are disclosed in U.S. Pat. No. 4,287,772. However, it will be apparent to one skilled in the art that the teachings of the present invention may be used in any thin film or semiconductor strain gauge without the necessity of mesa formation.

In prior art strain gauge devices, external temperature compensation resistors must be coupled to the strain gauge resistors in order to stabilize variations in the electrical characteristics of the transducer 12 when the transducer is subjected to different temperatures. In addition, external calibration resistors are typically required in order to balance the Wheatstone bridge configuration such that the induced strain on the transducer may be determined from a zero reference. The present invention provides integral temperature compensation and calibration resistors formed on the substrate on the transducer 12, such that the problems associated with external resistors are avoided.

Figure 2:
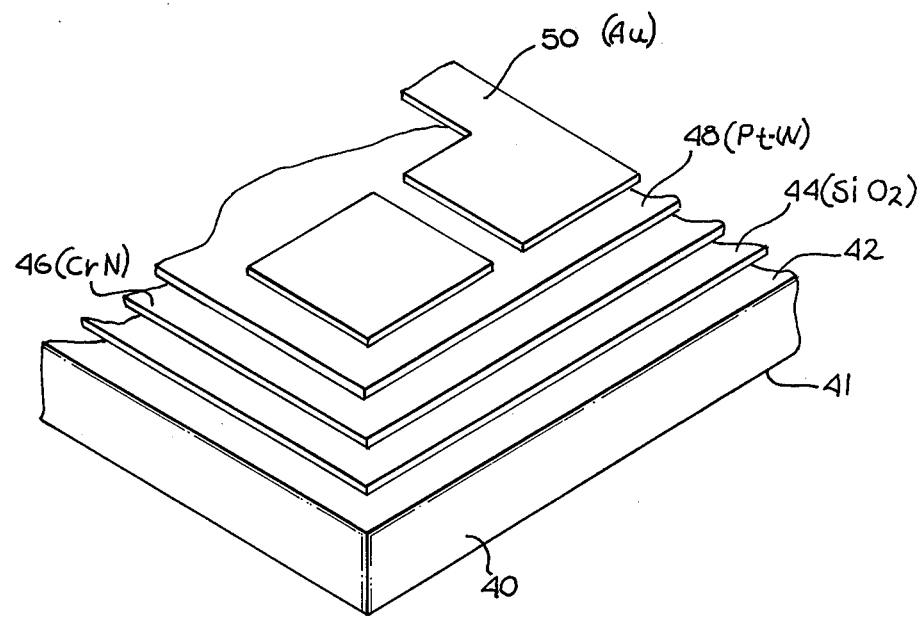
FIG. 2 is a cross sectional elevation view of a silicon substrate with several layers on its surface. This substrate with its layers, after processing, forms the transducer (strain gauge, temperature compensation and calibration resistors, and diaphragm).

With reference now to FIG. 2, the transducer substrate 40, in the presently preferred embodiment, is a monocrystalline silicon material 15-16 mils thick. This material is not employed for its usual semiconductor quality, thus various grades of silicon not otherwise suitable for semiconductor processing may be employed. Silicon is used since it has excellent elastic characteristics with low hysteresis, making it ideal for use as a strain gauge diaphragm. In addition, silicon is easily processed with existing semiconductor technology.

The fabrication process simultaneously fabricates a plurality of sensors on a single wafer as is commonly done in the fabrication of integrated circuits. In the following description, the processing of only a single substrate is discussed. However, it would be obvious to one skilled in the art that the steps are performed for the entire wafer and that the wafer is then "diced" into separate "chips" or sensors.

After well known cleaning and lapping steps, 14,000 Å of $SiO_2$ is grown (in a wet oxygen atmosphere) on both the upper 42 and lower 41 surface of the substrate 40. The $SiO_2$ layer is shown as layer 44 in FIG. 2. Next, on surface 44 a chromium nitride layer 46 or approximately 400 Å is sputtered onto the $SiO_2$ layer 44. This chromium nitride layer is used since it adheres to the silicone dioxide layer and promotes adhesion of the noble metal film. In addition, as will be described in more detail below, chromium nitride possesses a negative temperature coefficient of resistance making it suitable for use as a temperature compensation means.

The active strain gauge resistors, as well as temperature compensation resistors 33 and 35, are formed from a platinum alloy layer 48. In the presently preferred embodiment, this strain gauge material comprises platinum with 2-4% tungsten. This layer 48 which is approximately 400 Å thick is sputtered onto the chromium nitride layer 46, although other well known means may be employed to deposit the layer.

A gold layer 50 which is approximately 1 micron thick is next formed on the platinum layer 48 by sputtering or other well known means. It has been found, that the gold layer 50 possesses a temperature coefficient of resistance higher than the platinum alloy strain gauge material.

A photo-resist mask is next formed on the surface of the transducer 12, to define the pattern shown best in FIG. 4. Well known photo-lithographic techniques may be employed to define the pattern of serpentine shaped resistors 28, 30, 32 and 34 such that the resistors are etched into (and through) the gold layer 50. This is done by forming the resistor pattern (in a negative form) with the photo-resist and then etching the gold with a aqua-regia based gold etching solution. Next, in the presently preferred embodiment, a step which diffuses the gold into platinum alloy occurs, as is described in U.S. Pat. No. 4,287,772.

By maintaining the substrate with its associated layers at 225° to 600° C. for approximately 30 minutes, the gold diffuses into the platinum. This diffusion allows the platinum layer to be chemically etched in a subsequent step. For further description of this process, see U.S. Pat. No. 4,287,772. An alternate method to accomplish the platinum etch is ion milling.

It has been found, that the chromium nitride layer 46 has a negative thermal coefficient of resistivity (TCR) and thus partially compensates the strain gauge platinum alloy resistors which have a positive TCR. In addition to providing a bonding means and partial intrinsic temperature compensation for the various layers on the substrate 40, the chromium nitride layer is formed into temperature compensation resistors 50 and 52, by appropriate photo-lithographic masking steps. Moreover, the chromium nitride compensation resistors are defined on the substrate 40, such that they are laser trimable as shown in FIG. 4.

A photo-resist mask is also formed on the gold layer 50 in order to define additional compensation resistors 56 and 58 as best shown in FIGS. 3 and 4. In addition, gold resistor 60 is formed for use as a monitor resistor. Gold leads and contact pads, as well as conductive lines interconnecting the various contact pads with the active strain gauge resistors are defined, using well known masking and etching steps.

Once the strain gauge transducer 12 has been fully fabricated, in accordance with the above discussion, each transducer 12 is tested and balanced. In the presently preferred embodiment, a computer controlled calibration system applies calibrated temperatures and pressures to the transducer and automatically laser trims the various chromium nitride, platinum alloy and gold compensation and calibration resistors, in accordance with the requirements of each transducer in order to obtain a specified performance. In practice, each transducer 12 is tested at 0°, 25° and 100° C. for proper transfer function characteristics, and resistors 33, 35, 50, 52, 56 and 58, are laser trimmed to the appropriate values needed to balance the bridge configuration and to bring it into conformance with thermal specifications.

Thus, a transducer having integral temperature compensation and calibration resistors has been described. The present invention utilizes the physical temperature coefficient properties of platinum alloy, chromium nitride and gold in order to naturally obtain temperature compensation. In addition, while the present invention has been shown and described in conjunction with a strain gauge pressure transducer, it will be apparent to one skilled in the art that the invention may be used with other transducers.

We claim:

1. A semiconductor transducer having integral compensation resistors, comprising:
   a silicon substrate having a first and second surface;
   a silicon dioxide layer disposed on said first surface of said silicon substrate;
   at least one chromium nitride temperature compensation resistor formed on said silicon dioxide layer;
   a plurality of platinum alloy resistors formed on said silicon dioxide layer;
   a plurality of gold conductive lines disposed over said silicon dioxide layer interconnecting said resistors;
   whereby the electrical characteristics of said transducer when subjected to temperature variations may be adjusted as desired by varying the resistance of said compensation resistor.

2. The transducer as defined by claim 1 further including at least one gold temperature compensation resistor coupled to said other resistors by said gold lines.

3. The transducer as defined by claim 2 wherein said platinum resistors form a strain gauge comprising a 5 terminal four active arm Wheatstone bridge network (A,B,C,D,E).

4. The transducer as defined by claim 3 wherein said transducer includes two chromium nitride resistors, said chromium nitride resistors being coupled to network terminals B, and C, respectively, and are each coupled to a ground potential.

5. The transducer as defined by claim 4 wherein said transducer includes two platinum alloy compensation resistors, said platinum alloy resistors being coupled to network terminals D and E, respectively.

6. The transducer as defined by claim 5 wherein said transducer includes two gold resistors, said gold resistors being coupled to said platinum alloy compensation resistors respectively, and are each coupled to said ground potential.

7. The transducer as defined by claim 6 further including an additional gold monitor resistor on said silicon dioxide layer coupled between network terminal A and a power source.

8. The transducer as defined by claim 7 further including an additional chromium nitride monitor resistor on said silicon dioxide layer coupled between said additional gold monitor resistor and said power source.

9. The transducer as defined by claim 8 wherein said gold, chromium nitride and platinum alloy compensation resistors are laser trimmed for proper temperature compensation.

10. The transducer as defined by claim 9 wherein said substrate includes mesas on said second surface, such that said gold, chromium nitride and platinum alloy compensation resistors are disposed above thicker areas of said substrate than said platinum alloy strain gauge resistors.

* * * * *